US007064274B2

(12) United States Patent
O'Connor

(10) Patent No.: US 7,064,274 B2
(45) Date of Patent: Jun. 20, 2006

(54) APPLICATOR AND METHOD OF APPLICATION FOR SNAP WRAP MARKER

(75) Inventor: Timothy P. O'Connor, Newtown, PA (US)

(73) Assignee: Lem Products, Inc., Doylestown, PA (US)

( * ) Notice: Subject to any disclaimer, the term of this patent is extended or adjusted under 35 U.S.C. 154(b) by 0 days.

(21) Appl. No.: 11/232,070

(22) Filed: Sep. 21, 2005

(65) Prior Publication Data

US 2006/0060371 A1 Mar. 23, 2006

Related U.S. Application Data

(60) Provisional application No. 60/612,129, filed on Sep. 22, 2004.

(51) Int. Cl.
*H02G 15/02* (2006.01)

(52) U.S. Cl. .................... 174/74 A; 174/112; 248/74.2

(58) Field of Classification Search .................. 248/71, 248/74.2, 74.3, 74.4, 316.1, 316.7; 174/112, 174/74 A, 93

See application file for complete search history.

(56) References Cited

U.S. PATENT DOCUMENTS

| | | | | |
|---|---|---|---|---|
| 216,177 | A * | 6/1879 | Greig | 248/489 |
| 2,629,953 | A * | 3/1953 | Von Stackelberg et al. | 40/662 |
| 6,669,150 | B1 * | 12/2003 | Benoit et al. | 248/74.2 |
| 6,774,312 | B1 * | 8/2004 | Fatato | 174/102 D |

* cited by examiner

*Primary Examiner*—Chau N. Nguyen
(74) *Attorney, Agent, or Firm*—RatnerPrestia

(57) ABSTRACT

An applicator and method of application for a snap wrap marker which may be operated in one embodiment from ground level by a workman with the applicator at the end of a long pole. The pre-coiled plastic marker (for example) is manually uncoiled and its ends positioned to be releasably engaged by pressure holding clips which hold the marker in an open receiving position. The applicator is then raised, (for example) and an opening in the applicator is positioned on either side of the distant cable. The applicator is then pushed so that the marker is pushed downwardly out of the pressure holding clips and then coils itself around and engages the cable. The applicator is then removed leaving the marker coiled around the cable and the applicator ready for another application.

8 Claims, 4 Drawing Sheets

APPLICATOR AND METHOD OF APPLICATION FOR SNAP WRAP MARKER

CROSS REFERENCE TO RELATED APPLICATION

This application claims the benefit of priority to U.S. Provisional Patent Application No. 60/612,129, filed on Sep. 22, 2004, the contents of which are incorporated in this application by reference.

FIELD OF THE INVENTION

This invention relates to the field of applicators and applying snap wrap markers to cylindrical surfaces and particularly to out of reach cables or pipes.

BACKGROUND OF THE INVENTION

Snap wrap markers are known in the art to comprise a plastic sheet, for example, six inches in length and five inches in width. The plastic sheet is treated in a conventional manner so that the sheet has elasticity and in its rest state coils into a cylinder, for example, about 2½ inches in diameter. Thus, the plastic marker in its rest state is coiled for placement about a pipe or cable and in its rest state comprises approximately two layers of the coiled plastic sheet. This pre-coiled plastic marker 10 is shown in FIG. 1 and may be, for example, emergency orange, to identify overhead pipes and cables. More specifically, overhead fiber optic cables and cable television cables may be identified with specifically colored pre-coiled plastic markers for safety and identification purposes. The marker may also be printed in large letters with identification such as "CAUTION FIBER OPTIC CABLE" or other similar identification.

Snap wrap markers snap also similarly applied to identify distant pipes carrying liquids or enclosing wires, for example. These pipes may be at a distance either overhead or out of reach below and within a factory or warehouse.

Marker 10 is typically applied manually to an overhead cable when a workman is on a "cherry picker" or lift which places him at the height of a cable which is strung overhead on a telephone pole. When the workman is working on the cable itself, it is quite simple at that time to uncoil a marker and then allow it to coil around the cable. At other times, the marker is required to be applied to the cable when actual work is not being done on the cable itself. It would then be necessary for the workman to be specially raised for this sole purpose to the height of the cable which is, of course, expensive, time consuming and has risks from passing traffic.

SUMMARY OF THE INVENTION

An applicator and method of application for a snap wrap marker which may be operated in one embodiment from ground level by a workman with the applicator at the end of a long pole. The pre-coiled plastic marker (for example) is manually uncoiled and its ends positioned to be releasably engaged by pressure holding clips which hold the marker in an open receiving position. The applicator is then raised, (for example) and an opening in the applicator is positioned on either side of the distant cable. The applicator is then pushed so that the marker is pushed downwardly out of the pressure holding clips and then coils itself around and engages the cable. The applicator is then removed leaving the marker coiled around the cable and the applicator ready for another application.

DETAILED DESCRIPTION OF THE INVENTION

Figure 2:
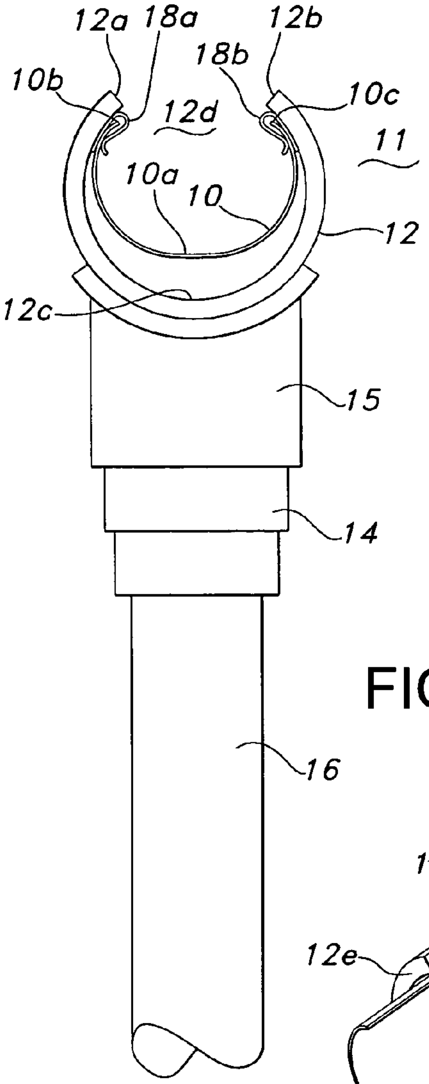
FIG. 2 is an end sectional view of the applicator of the present invention.
Figure 1:
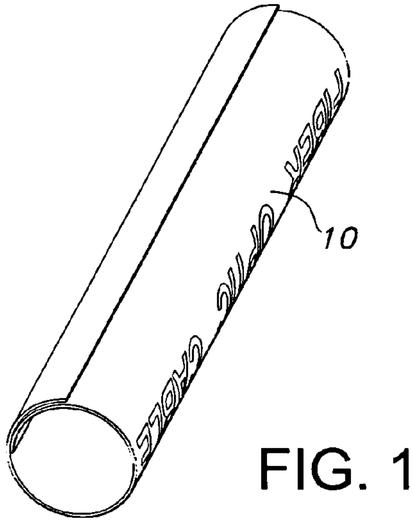
FIG. 1 is a perspective view of a convention snap wrap marker in its coiled rest state.
Figure 3:
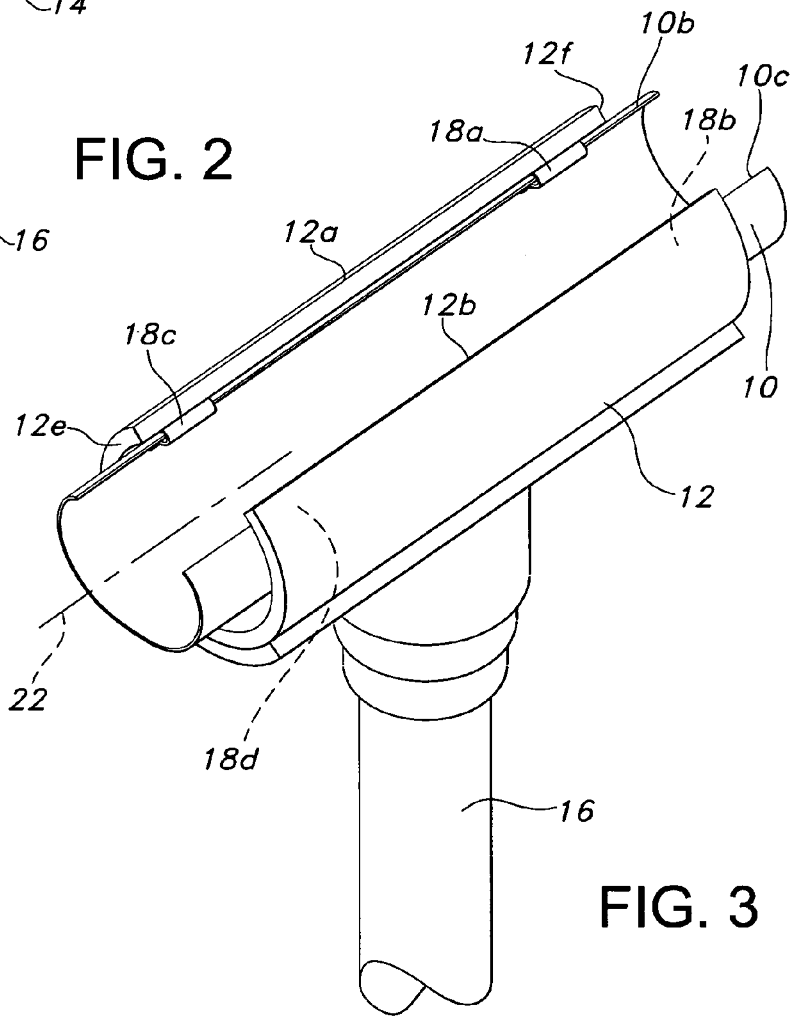
FIG. 3 is a perspective view of the positioner shown in FIG. 2 with the snap wrap marker loaded in the positioner.

As shown in FIGS. 2 and 3, applicator 11 comprises an open cylindrical tube section 12, which is cut away at the top of the cylinder to form two parallel longitudinally directed lips, 12*a* and 12*b*. Lips 12*a, b* form an opening 12*d* in section 12 leading to an inner surface 12*c* of section 12.

Cylindrical section 12 is rigidly secured to a shoulder section 15 which ends in a neck 14, and which engages an extended pole 16 of suitable length. The pole 16 may engage neck 14 by friction or threaded means. The applicator 11 may be made of plastic which is cast or made by other suitable manufacturing methods.

An exemplary opening 12*d* may be at the top of applicator 11. Alternatively the lips 12*a* and 12*b* may be positioned on the side of cylindrical section 12 forming opening 12*d*. It will be understood, that cylindrical section 12 preferably has an inner surface 12*c* which forms a chamber. In alternative embodiments, inner surface 12*c* may form other than a cylindrical surface and may for example, form a triangle, square or rectangle. Similarly the outer surface of section 12 may be formed with straight walls rather than cylindrical walls or other shapes as convenient for manufacture.

At least four clips 18*a*–18*d* are rigidly secured to the chamber inner surface 12*c* closely adjacent lips 12*a* and 12*b*. Specifically clips 18*a* and 18*c* are positioned adjacent the edge of lip 12*a* and clips 18*a* and 18*d* are positioned adjacent the edge of lip 12*b*. Clips 18*a*–18*d* are mounted so that their open ends face away from respective lips 12*a*, 12*b*. In addition clips 18*a* and 18*b* are adjacent cylinder end 12*d* while clips 18*c* and 18*d* are adjacent cylinder end 12*e*. Clips 18*a*–18*d* are positioned sufficiently apart so that ends 10*b*, 10*c* easily fit within the clips and maintain the marker open and in its substantially circular shape, as shown. It will be best seen in FIG. 3, that cylindrical section 12 is of sufficient length in the as longitudinal direction 22 between ends 12*e* and 12*f* to receive marker 10. In this embodiment, the longitudinal length of marker 10 is somewhat greater than that of section 12. Opening 12*d* between cylinder lips 12*a* and 12*b* is of sufficient dimension to easily receive a cable 20 or pipe and is of sufficient dimension to allow clips 18*a*–*d* to hold open marker 10 in position, as shown. In an exemplary embodiment the distance between lips 12_a_ and 12_b_ may be about 1½ to 2½ inches where the outer diameter of cylindrical section 12 may be about 3–5 inches.

Figure 5:
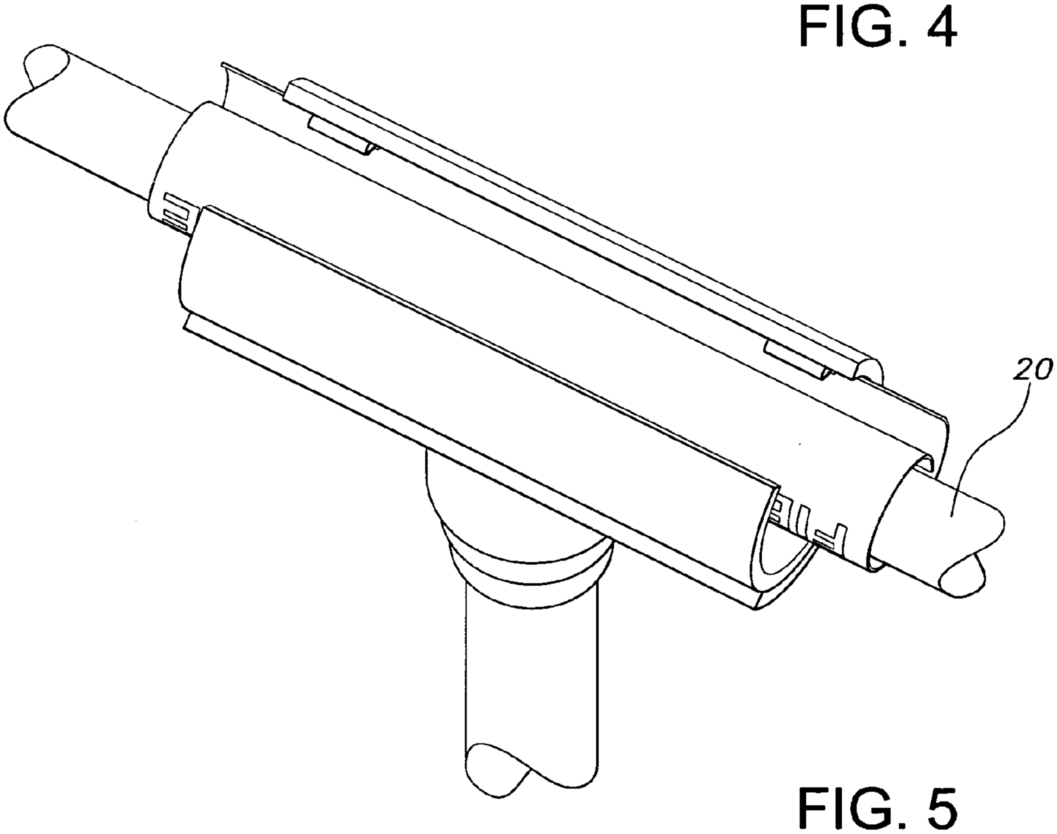
FIG. 5 is another perspective view similar to FIG. 4 in which a snap wrap marker begins to coil around the cable.

It will be understood that the shaping and sizing of applicator 12 is sufficient so that chamber inner surface 12_c_ is far enough from marker internal surface 10_a_ so that as applicator 11 is pushed upwardly, for example, and cable 20 sufficiently engages internal surface 10_a_ so that marker 10 does not engage chamber inner surface 12_c_ until marker edges are free of clips 18_a_–18_d_. Thus marker 10 is then free to fully engage the cable because of its pre-coiled elasticity. Further it will be understood that when inner surface 10_a_ of marker 10 is engaged by cable 20, as shown for example in FIG. 5, that it is forced out of its circular shape. In this shape there is still provided sufficient room between marker 10 and chamber inner surface 12_c_ to allow marker 10 to be forced out of clips 18_a_–18_d_ and be completely released from the clips.

It will be further understood that pole 16 is of sufficient length to comfortably allow workmen to handle applicator 11 and to reach a cable or pipe whether that cable or pipe is overhead or below the workmen.

Figure 4:
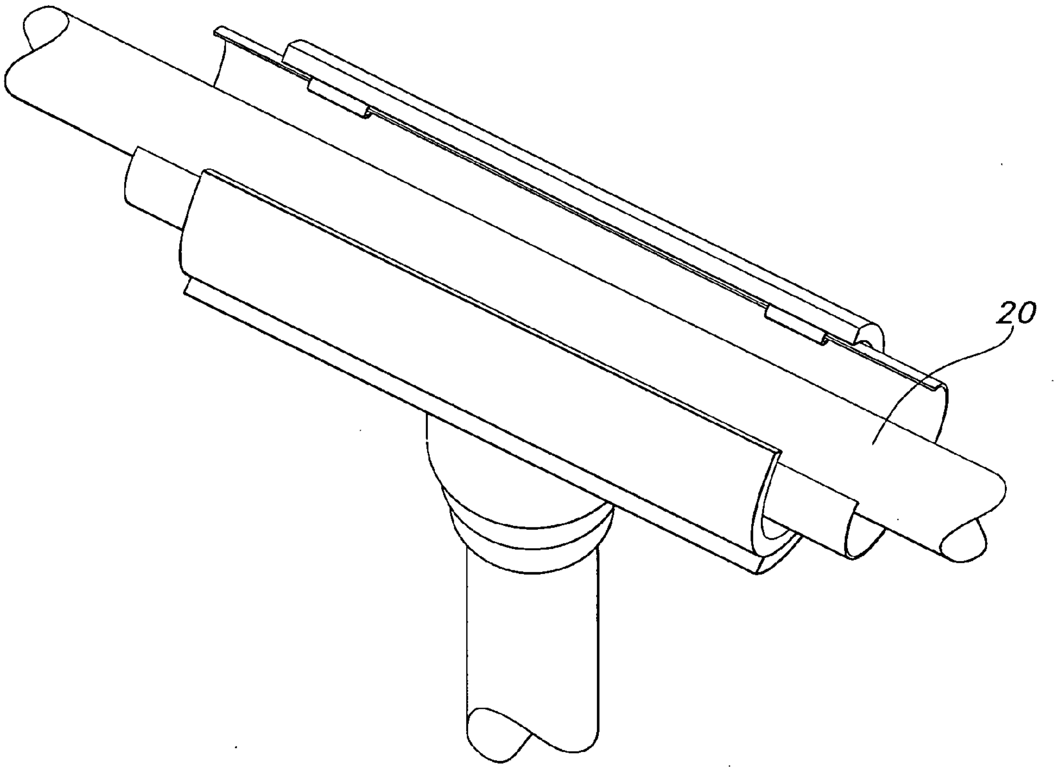
FIG. 4 is a perspective view similar to FIG. 3 in which a cable is positioned within the positioner.
Figure 6:
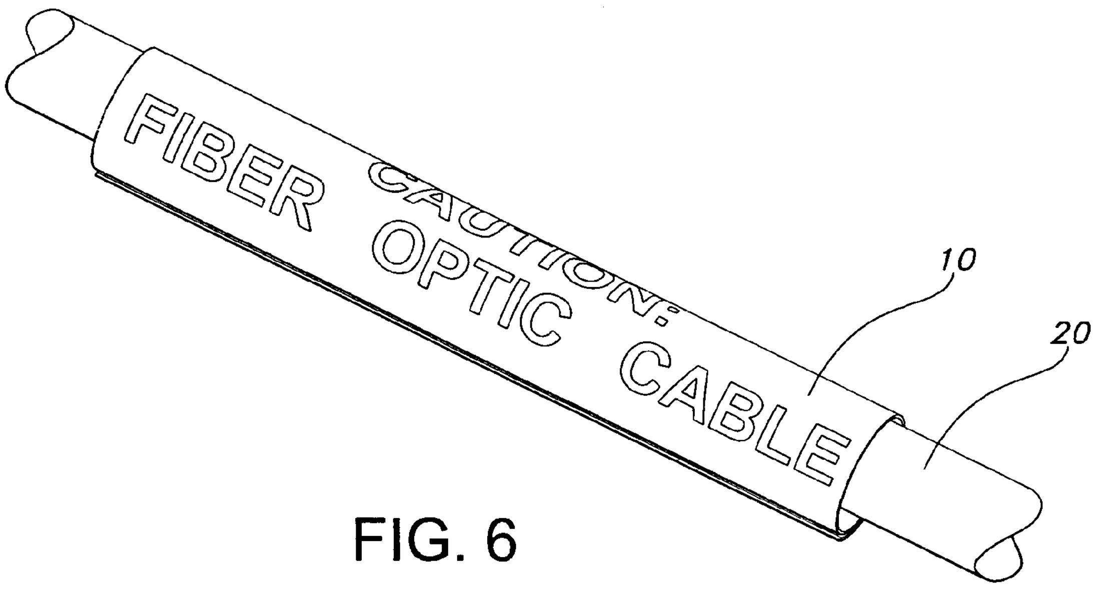
FIG. 6 is a perspective view of the snap wrap marker coiled on a cable.

An exemplarily method of operation is shown in FIGS. 3–6 in which marker 10 is manually uncoiled and one end 10_b_ is placed within pressure holding clips 18_a_ and 18_c_ and the other end 10_c_ is placed within pressure holding clips 18_b_ and 18_d_. Positioner 12 is manually positioned by way of pole 16 so that it is below cable 20 with lips 12_a_ and _b_ on either side of cable 20 so that the longitudinal direction 22 of cylindrical section 12 is parallel to the longitudinal direction of cable 20 as shown in FIG. 4. Positioner 11 is carefully pushed upwardly so that cable 20 passes through opening 12_d_ and until internal surface 10_a_ of marker 10 engages the outer surface of cable. The positioner is further pushed upwardly so that the ends 10_b_, 10_c_ of marker 10 are pulled out of clips 18_a_–18_d_ as marker 10 is forced downwardly towards chamber inner surface 12_c_. Thus, it will be seen that the distance between marker 10 and chamber inner surface 12_c_ is required to be of sufficient dimension to allow the ends of marker 10 to disengage from clips 18_a_–18_d_. Applicator 11 in this exemplary embodiment is then pulled down with cable 20 exiting from opening 12_d_ with the marker in place as shown in FIG. 6.

Figure 7:
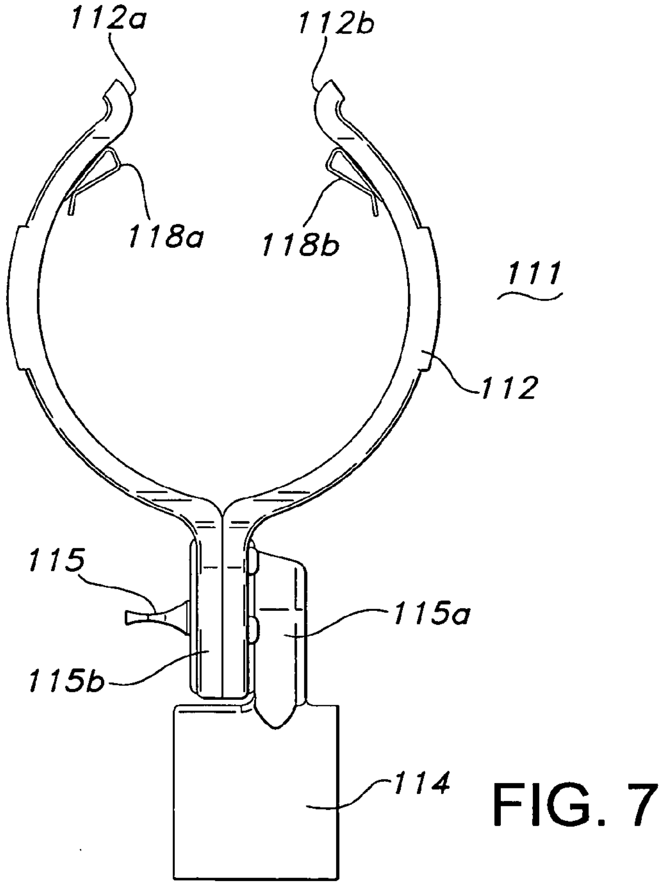
FIG. 7 is an end side view of further embodiment of the positioner of the present invention.
Figure 8:
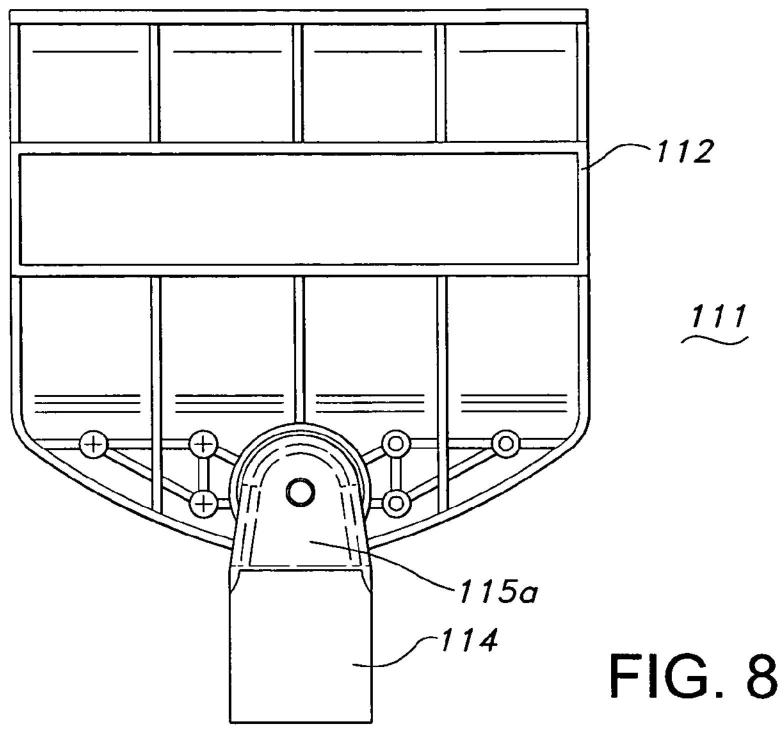
FIG. 8 is a side view of the positioner taken from the right of FIG. 7 of the further embodiment of the invention.
Figure 9:
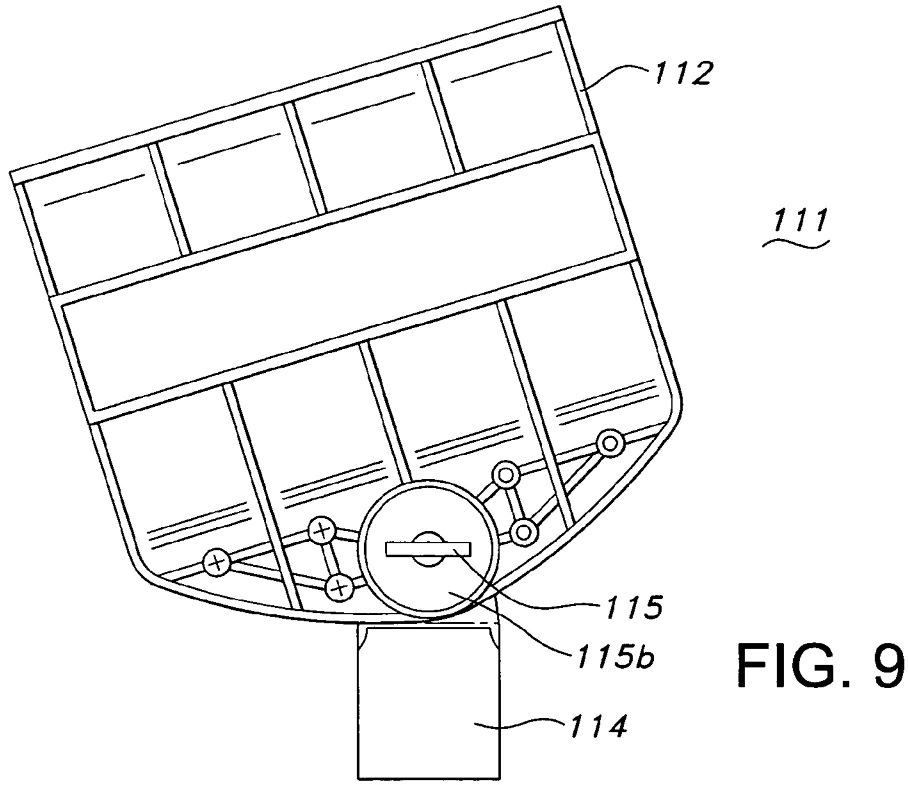
FIG. 9 is a side view of the positioner, as swiveled, taken from the left of FIG. 7 of the further embodiment.

Another exemplary embodiment is shown in FIGS. 7–9 in which cylindrical section 112 is formed by layers of plastic. In addition lips 112_c_ and 112_b_ are curved outwardly and clips 18_c_ and 18_b_ are positioned slightly away from a respective lip 112_a_, 112_b_ as shown in FIG. 7. The other clips, not shown, are similarly positioned. This is to be compared to the position of clips 18_a_–18_d_ as shown in FIGS. 2 and 3 in which these clips are positioned more closely adjacent to lips 12_a_ and 12_b_.

Cylindrical section 112 is formed at its bottom into a base, 115_b_ shown in FIG. 9, and is adapted to swivel with respect to member 115_a_ rigidly secured to neck 114. Neck 114 engages an extended pole, not shown, which may be of suitable length. A wing nut 115 is provided to engage a bolt extending from member 115_a_ to allow cylindrical section 112 to swivel to a desired position as shown in FIG. 9. This swiveling permits the positioner 111 to work in cramped or difficult areas where the upright position shown in FIG. 8 would not be practical.

Although the invention is illustrated and described herein with reference to specific embodiments, the invention is not intended to be limited to the details shown. Rather, various modifications may be made in the details within the scope and range of equivalents of the claims and without departing from the invention.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A method using an applicator having a chamber with an opening and an inner surface for attaching a pre-coiled plastic marker to a distant cylindrical surface, comprising the steps of:

(a) engaging the marker in the opening in the applicator in which (1) both ends of the marker are removably engaged and (2) a portion of the marker between the marker ends is positioned at a predetermined distance from the closest inner surface of the chamber of the applicator, (b) positioning the applicator with respect to the distant cylindrical surface adjacent the cylindrical opening and pushing the applicator for engagement of the distant cylindrical surface with an internal surface of the marker, (c) further pushing the applicator to force the disengagement of the ends of the marker with the applicator and to allow the marker to freely coil around the distant cylindrical surface, and (d) removing the applicator from the distant cylindrical surface.

2. The method of claim 1 in which there is provided the further step of forming the applicator so that the predetermined distance in step (a) is sufficient to allow the disengagement of the ends of the marker with the applicator in step (c) before the distant cylindrical surface engages the inner surface of the chamber.

3. An applicator having a chamber with an inner surface capable of attaching a pre-coiled plastic marker to a distant cylindrical surface, comprising:

the chamber having a longitudinally directed opening sufficiently sized to receive a portion of the longitudinal dimension of the distant cylindrical surface, a plurality of clips secured to the inner-surface adjacent the opening capable of releasably engaging ends of the plastic marker, wherein the chamber has a sufficient dimension to permit the disengagement of the marker ends from the clips when the applicator is moved to engage and push the marker with the distant cylindrical surface and to allow the marker to coil around the cylindrical surfaces.

4. The applicator of claim 3 in which there is provided a pre-coiled plastic marker.

5. The applicator of claim 3 in which the plurality of clips are secured to the inner surface of the chamber closely adjacent to the longitudinally directed opening and the openings in the clips face away from the longitudinally directed opening.

6. The applicator of claim 3 in which the plurality of clips are secured to the inner surface of the chamber spaced substantially adjacent to the longitudinally opening.

7. The applicator of claim 3 in which the dimension in the longitudinal direction of the chamber is less than that of the plastic marker.

8. The applicator of claim 3 in which there is provided a pole secured to the applicator and adapted to move the applicator with respect to the distant cylindrical surface.

* * * * *